United States Patent
Cartwright

(10) Patent No.: US 6,829,962 B2
(45) Date of Patent: Dec. 14, 2004

(54) STEERING COLUMN

(75) Inventor: Mark A. Cartwright, West Lafayette, IN (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 10/117,902

(22) Filed: Apr. 8, 2002

(65) Prior Publication Data

US 2003/0188598 A1 Oct. 9, 2003

(51) Int. Cl.[7] .............................................. B62D 1/18
(52) U.S. Cl. ........................... 74/493; 74/492; 74/497; 280/775
(58) Field of Search .......................... 74/493, 492, 495, 74/496, 497; 280/775

(56) References Cited

U.S. PATENT DOCUMENTS

| | | | |
|---|---|---|---|
| 4,507,982 A | | 4/1985 | Turner et al. .................. 74/493 |
| 4,554,843 A | | 11/1985 | Andersson ..................... 74/493 |
| 4,674,769 A | * | 6/1987 | Ota et al. ...................... 280/775 |
| 4,723,461 A | * | 2/1988 | Yoshida et al. ............... 74/493 |
| 4,732,050 A | | 3/1988 | Vollmer ........................ 74/493 |
| 4,752,085 A | * | 6/1988 | Yamamoto .................... 280/775 |
| 4,958,852 A | * | 9/1990 | Kohno et al. ................. 280/775 |
| 4,972,732 A | | 11/1990 | Venable et al. ............... 74/493 |
| 5,722,299 A | * | 3/1998 | Yamamoto et al. ........... 74/493 |
| 2003/0094061 A1 | | 5/2003 | Cartwright et al. |

FOREIGN PATENT DOCUMENTS

GB  2306629 A  7/1997

* cited by examiner

Primary Examiner—Marcus Charles
Assistant Examiner—Julie K. Smith
(74) Attorney, Agent, or Firm—Tarolli, Sundheim, Covell & Tummino L.L.P.

(57) ABSTRACT

A steering column (10) includes a steering column member (12). A mounting bracket (66) connects the steering column (10) to a vehicle frame. The mounting bracket (66) has a surface defining an aperture (77). A support (24), through which the steering column member (12) extends, is connected with the mounting bracket (66). The support (24) supports the steering column member (12) for rotation about a longitudinal axis (26) of the steering column member (12) and is movable relative to the mounting bracket. A locking mechanism (130) prevents movement of the support (24) relative to the mounting bracket (66). A first portion (42) is connected with the support (24) and is movable with the support (24) and the steering column member (12) relative to the mounting bracket (66). A follower pin (63) extends from the first portion (42) and into the aperture (77) in the mounting bracket (66). The follower pin (63) engages the surface defining the aperture (77) to limit movement of the steering column member (12) relative to the mounting bracket (66). The follower pin (63) is spaced apart from the locking mechanism (130).

10 Claims, 3 Drawing Sheets

STEERING COLUMN

FIELD OF THE INVENTION

The present invention relates to an adjustable steering column, and more specifically, to limiting the movement of an adjustable steering column.

BACKGROUND OF THE INVENTION

A known steering column is described in U.S. Pat. No. 4,507,982. U.S. Pat. No. 4,507,982 discloses an adjustable steering column assembly having a column part, a support rotatably carrying the column part, and a bracket carrying the support and secured to a fixed member. The support is movable relative to the bracket. A lock fixes the bracket and the support in a desired relative position. A locking bar of the lock engages an edge of an aperture to limit relative movement between the bracket and the support.

SUMMARY OF THE INVENTION

A steering column of the present invention includes a steering column member connectable with a steering wheel and rotatable to turn steerable vehicle wheels. A mounting bracket connects the steering column to a vehicle frame. The mounting bracket has a surface defining an aperture. A support, through which the steering column member extends, is connected with the mounting bracket. The support supports the steering column member for rotation about a longitudinal axis of the steering column member. The support is movable relative to the mounting bracket. A locking mechanism prevents movement of the support relative to the mounting bracket.

A first portion is connected with the support and is movable with the support relative to the mounting bracket. A follower pin extends from the first portion and into the aperture in the mounting bracket. The follower pin engages the surface defining the aperture to limit movement of the steering column member relative to the mounting bracket. The follower pin is spaced apart from the locking mechanism.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2A is a schematic sectional view of FIG. 1 with parts removed for clarity;

DESCRIPTION OF THE INVENTION

Figure 1:
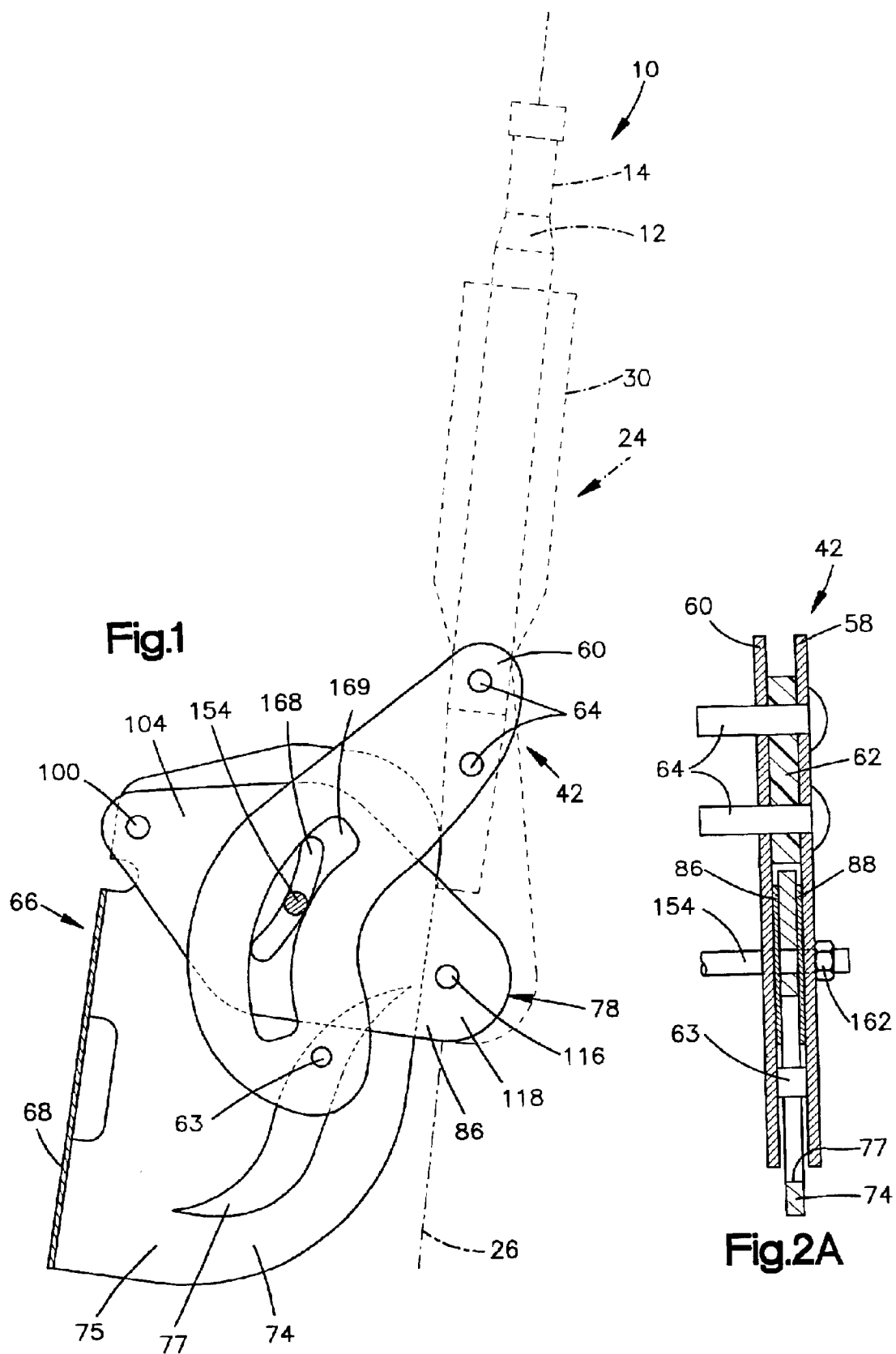
FIG. 1 is a schematic side view of a steering column constructed in accordance with the present invention.
Figure 2:
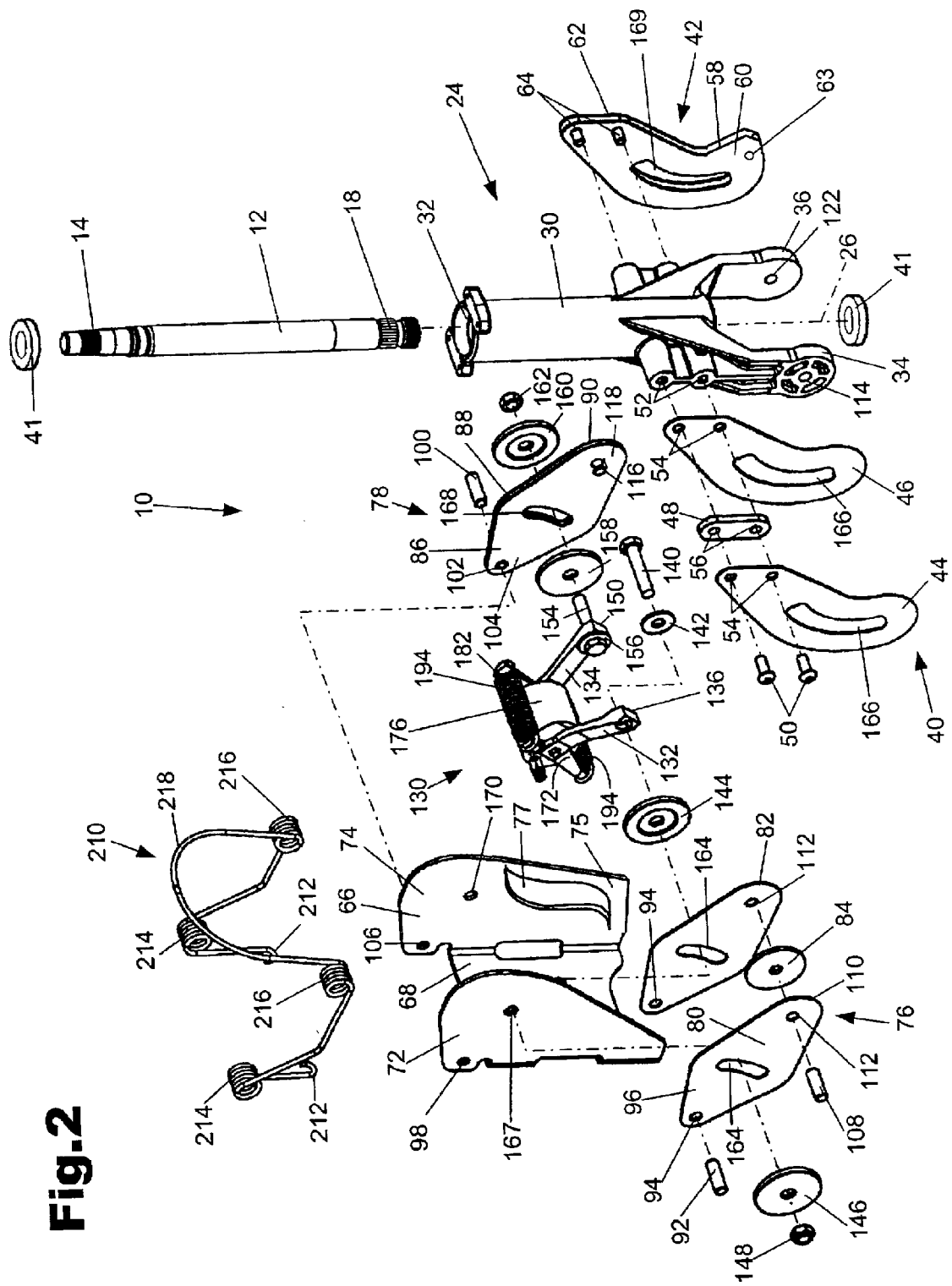
FIG. 2 is an exploded view of the steering column of FIG. 1.

A vehicle steering column 10 constructed according to the present invention is illustrated in FIGS. 1 and 2. The steering column 10 includes a rotatable steering column member 12 to turn steerable vehicle wheels (not shown). The steering column member 12 has an end 14 connectable with a steering wheel (not shown) in manner known in the art.

An end 18 (FIG. 2) of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 (FIGS. 1 and 2) supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 (FIG. 2) has a tubular portion 30 with a passage 32 through which the steering column member 12 extends. Arm portions 34 and 36 extend from the tubular portion 30. The tubular portion 30 is made by casting and may have any desired shape. Bearings 41 located in the passage 32 support the steering column member 12 for rotation relative to the support 24.

The support 24 includes locking portions 40 and 42 extending axially from opposite sides of the tubular portion 30. The locking portion 40 includes plates 44 and 46 fixedly connected to each other with a spacer 48 between them. The locking portion 40 is fixedly connected to the tubular portion 30 by fasteners 50, such as screws. The fasteners 50 threadably engage openings 52 in the tubular portion 30 and extend through openings 54 in the plates 44 and 46 and through openings 56 in the spacer 48.

The locking portion 42 includes plates 58 and 60 fixedly connected to each other with a spacer 62 between them. The locking portion 42 is fixedly connected to the tubular potion 30 by fasteners 64, such as screws. The fasteners 64 threadably engage openings in the tubular portion 30 and extend through openings in the plates 58 and 60 and through openings in the spacer 62. The locking portion 42 is identical to locking portion 40 except for a follower pin 63 connected with the plates 58 and 60. The follower pin 63 extends perpendicular to and between the plates 58 and 60 (FIG. 2A).

A mounting bracket 66 (FIG. 2) connects the steering column 10 with a vehicle frame. The mounting bracket 66 has a back wall 68 with openings for receiving fasteners to connect the mounting bracket to the vehicle frame. The mounting bracket 66 is connected to the vehicle frame using fasteners (not shown), such as bolts, as known in the art.

A pair of side walls 72 and 74 extend from the back wall 68 of the mounting bracket 66. The side walls 72 and 74 extend generally perpendicular to the back wall 68 and parallel to each other. The back wall 68 interconnects the side walls 72 and 74. The side wall 74 of mounting bracket 66 (FIG. 2) is identical to side wall 72 except for an extension at end 75 and an aperture 77 located in the extension. A guide surface defines the aperture 77. The follower pin 63 (FIGS. 2A and 2) extends through the aperture 77 in the side wall 74 and is engageable with the guide surface of the aperture to limit movement of the support 24 relative to the mounting bracket 66. Although the follower pin 63 is shown connected to the locking portion 42, it is contemplated that the follower pin could be connected with the side wall 74 and extend into an aperture in the locking portion 42.

A pair of identical arms 76 and 78 (FIG. 2) interconnect the support 24 and the mounting bracket 66. The arm 76 includes a pair of plates 80 and 82 fixedly connected together with a washer 84 between them. The side wall 72 of the mounting bracket 66 also extends between the plates 80 and 82. The arm 78 includes a pair of plates 86 and 88 fixedly connected together with a washer 90 between them. The side wall 74 of the mounting bracket 66 also extends between the plates 86 and 88.

A pin 92 extends through openings 94 in an end 96 of the arm 76. The pin 92 is received in an opening 98 in the side wall 72 to pivotally connect the arm 76 to the side wall 72. A pin 100 extends through openings 102 in an end 104 of the arm 78. The pin 100 is received in an opening 106 in the side wall 74 to pivotally connect the arm 78 to the side wall 74. Accordingly, the arms 76 and 78 can pivot relative to the mounting bracket 66. The side wall 72 is located between plates 80, 82 of the arm 76. The arm 76 is located between plates 44, 46 of locking portion 40. The side wall 74 is located between plates 86, 88 of the arm 78. The arm 78 is located between plates 58, 60 of locking portion 42.

A pin 108 (FIG. 2) pivotally connects an end 110 of the arm 76 to the support 24. The pin 108 extends through openings 112 in the end 110 and the washer 84 and into an opening 114 in the arm portion 34 of the support 24. A pin 116 pivotally connects an end 118 of the arm 78 with the arm portion 36 of the support 24. The pin 116 extends through openings in the end 118 and the washer 90 and into an opening 122 in the support 24. Accordingly, the support 24 can pivot relative to the arms 76 and 78.

A locking mechanism 130 (FIG. 2) locks the arms 76 and 78 in any one of a plurality of pivot positions relative to the mounting bracket 66. The locking mechanism 130 also locks the support 24 in any one of a plurality of pivot positions relative to the arms 76 and 78. The locking mechanism 130 applies a force to clamp the arm 76 and the side wall 72 of the mounting bracket 66 between the plates 44 and 46 of the locking portion 40 of the support 24. The locking mechanism 130 also clamps the arm 78 and the side wall 74 of the mounting bracket 66 between the plates 58 and 60 of the locking portion 42 of the support 24.

Figure 3:
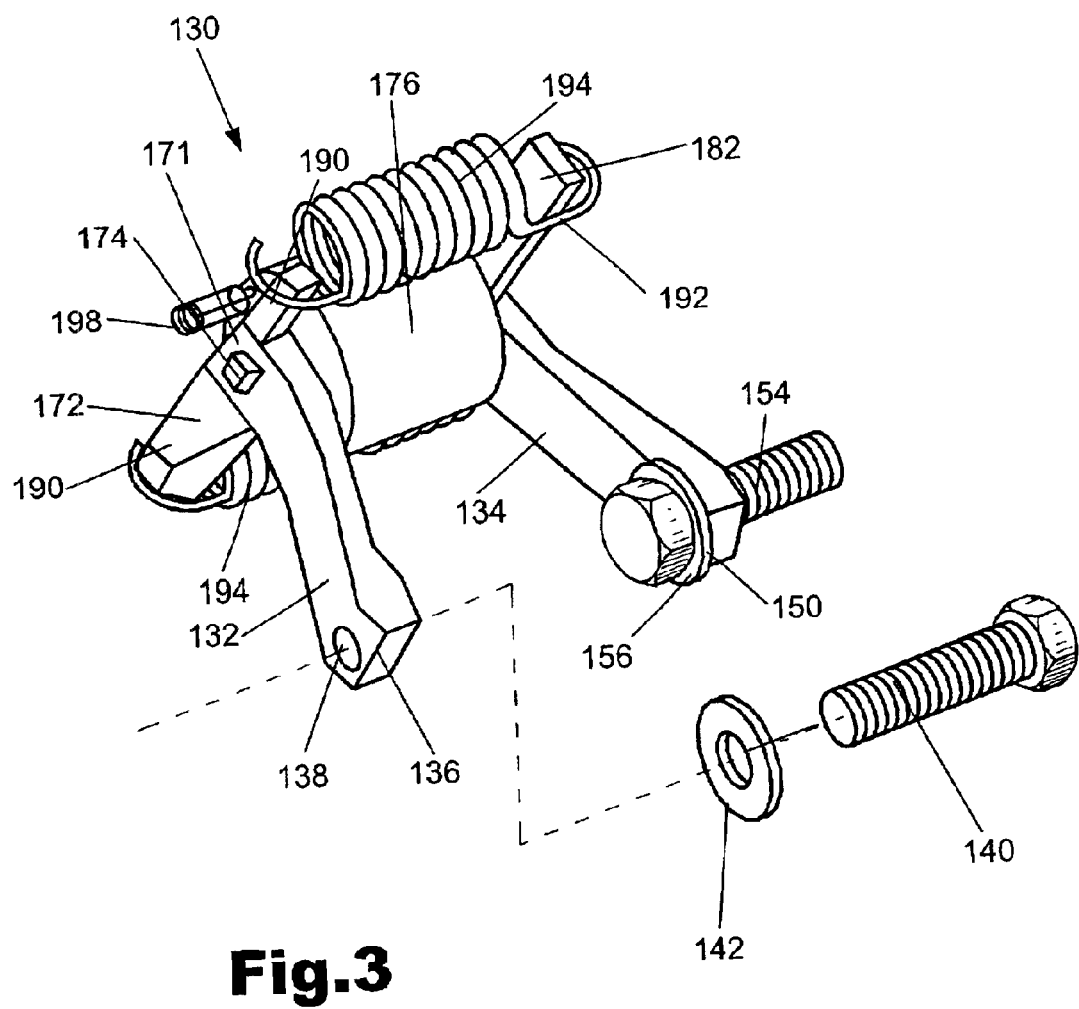
FIG. 3 is an enlarged view of a locking mechanism of the steering column of FIG. 2.

The locking mechanism 130 (FIGS. 2 and 3) includes locking levers 132 and 134 that apply a force to the plates 46 and 60 of the locking portions 40 and 42 of the support 24 to prevent movement of the support 24 relative to the mounting bracket 66. The locking lever 132 (FIG. 3) has an end 136 with an opening 138 through which a locking shaft or bolt 140 extends. The bolt 140 (FIG. 2) also extends through washers 142, 144 and 146. The washer 144 is located between the end 136 and the plate 46 of the support 24. A nut 148 threadably engages the bolt 140 and presses the washer 146 against the plate 44 of the support 24. The locking lever 134 (FIG. 3) has an end 150 with an opening through which a locking shaft or bolt 154 extends. The bolt 154 also extends through washers 156, 158 and 160. The washer 158 is located between the end 150 and the plate 60 of the support 24. A nut 162 (FIG. 2) threadably engages the bolt 154 and presses the washer 160 against the plate 58 of the support 24.

The locking shaft 140 (FIG. 2) extends through arcuate slots 164 in the arm 76 and arcuate slots 166 in the locking portion 40 of the support 24. The arcuate slots 164 overlie or line-up with arcuate slots 166 in the locking portion 40 (FIG. 1). The arcuate slots 164 in the arm 76 are located between the ends 96 and 110 of the arm 76. The locking shaft 140 also extends through opening 167 in the side wall 72 of the mounting bracket 66.

The arm 78 includes arcuate slots 168 which overlie or line-up with arcuate slots 169 in the locking portion 42 (FIG. 1). The locking shaft 154 (FIG. 2) extends through the arcuate slots 168 in the arm 78 and arcuate slots 169 in the locking portion 42 of the support 24. The arcuate slots 168 in the arm 78 are located between the ends 104 and 118 of the arm 78. The locking shaft 154 also extends through opening 170 in the side wall 74 of the mounting bracket 66.

The arcuate slots 164 in the arm 76 and the arcuate slots 166 in the locking portion 40 of the support 24 define guide surfaces for the locking shaft 140. The arcuate slots 168 in the arm 78 and the arcuate slots 169 in the locking portion 42 of the support 24 define guide surfaces for the locking shaft 154. The locking shaft 140 slides along the guide surfaces of the slots 164 and 166 during movement of the support 24 relative to the mounting bracket 66. The locking shaft 154 slides along the guide surfaces of the slots 168 and 169 during movement of the support 24 relative to the mounting bracket 66.

The locking lever 132 (FIG. 3) has an end 171 connected with a cross member 172 and a piston 174 extending into a cylinder 176. The locking lever 134 has an end (not shown) opposite from the end 150 connected with a cross member 182 and the cylinder 176. The cross member 172 has opposite ends 190 and the cross member 182 has opposite ends 192. Coil springs 194 extend between the ends 190 and 192 of the cross members 172 and 182. The springs 194 apply a force to pull the end 171 of the locking lever 132 toward the end of the locking lever 134 opposite from the end 150 to move the ends 136 and 150 away from each other. Accordingly, the ends 136 and 150 of the locking levers 132 and 134 apply force to the plates 46 and 60 of the locking portions 40 and 42 to clamp the arms 76 and 78 and the side walls 72 and 74 between the plates 44, 46 and plates 58, 60 of the support 24.

The cylinder 176 has a port 198 for receiving a pressurized fluid, such as air. The pressurized fluid moves the piston 174 and the cylinder 176 relative to each other against the force of the springs 194. Accordingly, when the pressurized fluid is applied to the piston 174, the force applied by the springs 194 is released and the steering column 12 can be positioned relative to the mounting bracket 66.

A spring member 210 (FIG. 2) urges the support 24 to pivot in a counter-clockwise direction, as viewed in FIG. 2, relative to the arms 76 and 78 and the arms to pivot in a counter-clockwise direction relative to the mounting bracket 66. The spring member 210 (FIG. 2) has ends 212 that engage the mounting bracket 66 to connect the spring member to the mounting bracket. Coiled portions 214 of the spring member extend around and engage the pins 92 and 100. Coiled portions 216 extend around and engage the pins 108 and 116. A curved portion 218 of the spring member 210 extends between the coiled portions 216 and engages the support 24. The spring member 210 urges the steering column 10 into an out of the way position. Although the spring member 210 is shown as having coiled portions 214 and 216 and curved portion 218, it is contemplated that any mechanism may be used to urge the steering column 10 to the out of the way position. It is also contemplated that the steering column 10 may not be urged to the out of the way position.

When pressurized fluid is applied to the cylinder 176, the end 171 of the locking lever 132 and the end of the locking lever 134 opposite the end 150 are moved away from each other and the ends 136 and 150 are moved toward each other. When the ends 136 and 150 are moved toward each other, the support 24 may be pivoted relative to the arms 76 and 78 and the arms may be pivoted relative to the mounting bracket 66.

The arms 76 and 78 move relative to the bolts 140 and 154 and the mounting bracket 66. The locking portions 40 and 42 of the support 24 also move relative to the bolts 140 and 154 and the mounting bracket 66. The follower pin 63 engages the guide surface of the aperture 77 in the mounting bracket 66 to limit movement of the support 24 and arms 76, 78 relative to the mounting bracket.

After the support 24 is positioned relative to the mounting bracket 66, the pressurized fluid is released from the cylinder 176. When the pressurized fluid is released from the cylinder 176, the end 171 of the locking lever 132 and the end of the locking lever 134 opposite the end 150 move toward each other and the ends 136 and 150 move away from each other. As the ends 136 and 150 move away from each other, the arms 76 and 78 and the side walls 72 and 74 are clamped between the plates 44, 46 and plates 58, 60 of the locking portions 40 and 42 of the support 24. The arms 76 and 78 and the side walls 72 and 74 are clamped to prevent movement of the support 24 relative to the mounting bracket 66.

The slots 164, 166, 168 and 169 define maximum limits of movement between the support 24 and the mounting bracket 66. The range of relative movement between the support 24 and the mounting bracket 66 within the slots 164, 166, 168 and 169 is limited since the follower pin 63 can only move within the limits of the aperture 77 in the side wall 74 of the mounting bracket 66. As a result, the steering column can only be adjusted within the limits defined by the aperture 77. The limits defined by the aperture 77 are smaller than the limits defined by the slots 166, 164, 168, 169. The guide surface in the aperture 77 defines the range of movement between the support 24 and the bracket 66 within the maximum limits of movement defined by the slots 164, 166, 168 and 169.

The range of relative movement between the support 24 and the bracket 66 is defined by the shape of the aperture 77 to prevent the adjustable steering column from engaging a vehicle dash structure, a vehicle driver, and/or a vehicle seat Consequently, only the shape of the aperture 77 needs to be changed to change the range of relative movement between the bracket 66 and support 24. Thus, the adjustable steering column 10 is advantageously and cost effectively adaptable to provide different ranges of movement for the steering column.

From the above description of the invention, those skilled in the art will perceive improvements, changes and modifications. For example, the shape of the aperture 77 in the side wall 74 of the mounting bracket 66 is shown for illustrative purposes only. In practice, the aperture 77 can have any other desired shape. The geometry of the column 10 in conjunction with the shape of the aperture 77 and follower pin 63 will describe a specific envelope for column movement.

In addition, although the aperture 77 is illustrated in only the side wall 74 of the mounting bracket, it is contemplated that the side wall 72 could have an aperture also with the locking portion 40 having the identical construction as the locking portion 42. In this case, another follower pin can extend perpendicular to and between plates 44 and 46 on locking portion 40 for engaging the surfaces defining an aperture in the side wall 72. Further, any suitable locking mechanism may be used rather than the specific locking mechanism described. The specific locking mechanism described is for illustrative purposes only. Such improvements, changes and modifications within the skill of the art are intended to be covered by the appended claims.

What is claimed is:

1. A steering column comprising:
    a steering column member connectable with a steering wheel and rotatable to turn steerable vehicle wheels;
    a mounting bracket which connects said steering column to a vehicle frame;
    a support connected with said mounting bracket and through which said steering column member extends, said support supporting said steering column member for rotation about a longitudinal axis of said steering column member and being movable relative to said mounting bracket;
    a locking mechanism that prevents movement of said support relative to said mounting bracket; and
    a first portion connected with said support and movable with said support relative to said mounting bracket;
    one of said mounting bracket and said first portion having a surface defining an aperture and the other of said mounting bracket and said first portion having a follower pin extending into said aperture, said follower pin engaging said surface defining said aperture to limit movement of said support relative to said mounting bracket, said follower pin being spaced apart from said locking mechanism, said follower pin being prevented from moving axially relative to the other of said mounting bracket and said first portion.

2. The steering column as defined in claim 1 wherein said mounting bracket includes said surface defining said aperture.

3. The steering column as defined in claim 2 wherein said first portion includes said follower pin that extends into said aperture in said mounting bracket.

4. A steering column comprising:
    a steering column member connectable with a steering wheel and rotatable to turn steerable vehicle wheels;
    a mounting bracket which connects said steering column to a vehicle frame;
    a support connected with said mounting bracket and through which said steering column member extends, said support supporting said steering column member for rotation about a longitudinal axis of said steering column member and being movable relative to said mounting bracket;
    a locking mechanism that prevents movement of said support relative to said mounting bracket;
    a first portion connected with said support and movable with said support relative to said mounting bracket;
    one of said mounting bracket and said first portion having a surface defining an aperture and the other of said mounting bracket and said first portion having a follower pin extending into said aperture, said follower pin engaging said surface defining said aperture to limit movement of said support relative to said mounting bracket, said follower pin being spaced apart from said locking mechanism; and
    a first arm interconnecting said mounting bracket and said support and including two plates having surfaces defining slots, said first portion including two plates having surfaces defining slots, said two plates of said first arm being located between said two plates of said first portion, said slots of said first arm and said slots of said first portion overlying each other, said locking mechanism including a first locking shaft extending into said overlying slots, said first locking shaft slidably engaging said surfaces defining said overlying slots during movement of said support relative to said mounting bracket, said overlying slots defining a maximum amount of relative movement between said support and said mounting bracket, said follower pin engaging said surface defining said aperture to limit relative movement between said support and said mounting bracket to an amount less than said maximum amount.

5. A The steering column as defined in claim 4 wherein said follower pin extends perpendicular to and between said two plates of said first portion.

6. The steering column as defined in claim 3 wherein said mounting bracket includes first and second side walls interconnected by a back wall and wherein said first side wall includes said aperture.

7. The steering column as defined in claim 6 wherein said first side wall is located between said two plates of said first arm, and said first arm and said first side wall are located between said two plates of said first portion of said support.

8. The steering column as defined in claim 7 wherein said locking mechanism clamps said plates of said first portion, said plates of said first arm, and said first side wall together to prevent movement of said support relative to said arms and said mounting bracket.

9. The steering column as defined in claim 8 further including a second portion connected with said support and movable with said support relative to said mounting bracket and a second arm interconnecting said mounting bracket and said support, said second arm including two plates having surfaces defining slots, said second portion including two plates having surfaces defining slots, said two plates of said second arm being located between said two plates of said second portion, said slots of said second arm and said slots of said second portion overlying each other, said locking mechanism including a second locking shaft extending into said overlying slots of said second arm and said second portion, said second locking shaft slidably engaging said surfaces defining said overlying slots of said second arm and said second portion during movement of said support relative to said mounting bracket, said overlying slots of said second arm and said second portion defining said maximum amount of relative movement between said support and said mounting bracket.

10. The steering column as defined in claim 9, wherein said locking mechanism clamps said plates of said second portion, said plates of said second arm, and said second side wall to each other to prevent movement of said support relative to said mounting bracket.

\* \* \* \* \*

UNITED STATES PATENT AND TRADEMARK OFFICE
CERTIFICATE OF CORRECTION

PATENT NO. : 6,829,962 B2
DATED : December 14, 2004
INVENTOR(S) : Mark A. Cartwright Page 1 of 1

It is certified that error appears in the above-identified patent and that said Letters Patent is hereby corrected as shown below:

<u>Column 7,</u>
Line 11, after "claim" change "3" to -- 4 --.

Signed and Sealed this

Twenty-fourth Day of May, 2005

JON W. DUDAS
*Director of the United States Patent and Trademark Office*